US012679567B2

(12) United States Patent
Wibrantz

(10) Patent No.: US 12,679,567 B2
(45) Date of Patent: Jul. 14, 2026

(54) AGRICULTURAL CHEMICAL APPLICATION DRONE

(71) Applicants: Luciano Wibrantz, Luis Eduardo Magalhães (BR); Russell Hedrick, Hickory, NC (US)

(72) Inventor: Luciano Wibrantz, Luis Eduardo Magalhães (BR)

( * ) Notice: Subject to any disclaimer, the term of this patent is extended or adjusted under 35 U.S.C. 154(b) by 0 days.

(21) Appl. No.: 19/357,868

(22) Filed: Oct. 14, 2025

(65) Prior Publication Data

US 2026/0109491 A1 Apr. 23, 2026

(51) Int. Cl.
| | |
|---|---|
| *B64U 101/40* | (2023.01) |
| *B64D 1/18* | (2006.01) |
| *B64U 10/14* | (2023.01) |
| *B64U 20/50* | (2023.01) |
| *B64U 20/65* | (2023.01) |
| *B64U 20/83* | (2023.01) |
| *B64U 30/293* | (2023.01) |
| *B64U 50/30* | (2023.01) |
| *B64U 60/50* | (2023.01) |

(52) U.S. Cl.
CPC .............. *B64U 10/14* (2023.01); *B64D 1/18* (2013.01); *B64U 20/50* (2023.01); *B64U 20/65* (2023.01); *B64U 20/83* (2023.01); *B64U 30/293* (2023.01); *B64U 50/30* (2023.01); *B64U 60/50* (2023.01); *B64U 2101/40* (2023.01); *B64U 2201/10* (2023.01); *B64U 2201/20* (2023.01)

(58) Field of Classification Search
CPC ........ B64U 10/14; B64U 20/50; B64U 20/65; B64U 20/83; B64U 50/30; B64U 60/50; B64U 2101/40; B64D 1/18
See application file for complete search history.

(56) References Cited

U.S. PATENT DOCUMENTS

| | | | | |
|---|---|---|---|---|
| 11,147,257 | B2 * | 10/2021 | Warren, Jr. | ........... G05D 1/101 |
| 2018/0043386 | A1 * | 2/2018 | Busby | ................... B05B 9/0403 |
| 2020/0113166 | A1 * | 4/2020 | Warren, Jr. | ........... B64D 47/08 |
| 2022/0111960 | A1 * | 4/2022 | Tran | ......................... A01G 7/00 |
| 2024/0074428 | A1 * | 3/2024 | Mccann | ................. G06V 20/17 |
| 2024/0253828 | A1 * | 8/2024 | Mccann | ................. A01C 7/085 |

* cited by examiner

*Primary Examiner* — Tye William Abell
(74) *Attorney, Agent, or Firm* — Kyle A. Fletcher, Esq.

(57) ABSTRACT

The agricultural chemical application drone may include a drone, a computer processor, a tank, a monocular camera, binocular cameras, a LiDAR sensor, a front radar, a rear radar, a spraying system, and one or more flood lights. The drone may be an unmanned aerial vehicle optimized for agricultural applications. The drone may be operable to carry a payload of 150 kg. The front radar may allow the drone to detect and avoid collisions. The binocular cameras may identify fine obstacles. The rear radar may measure distances up to 100 meters with an accuracy of 1 cm. The drone may utilize the binocular cameras, the front radar, and the LiDAR sensor cooperatively to detect and avoid obstacles.

15 Claims, 5 Drawing Sheets

AGRICULTURAL CHEMICAL APPLICATION DRONE

CROSS REFERENCES TO RELATED APPLICATIONS

This application claims the benefit of priority to Brazilian Application No. 870240089716 filed on Oct. 21, 2024, and entitled "AGRICULTURAL CHEMICAL APPLICATION DRONE", which is incorporated by reference herein in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of agricultural chemical application systems and unmanned aerial vehicles, more specifically, an agricultural chemical application drone.

SUMMARY OF INVENTION

The agricultural chemical application drone may comprise a drone, a computer processor, a tank, a monocular camera, binocular cameras, a LiDAR sensor, a front radar, a rear radar, a spraying system, and one or more flood lights. The drone may be an unmanned aerial vehicle (UAV) optimized for agricultural applications. The drone may be operable to carry a payload of 150 kg. The front radar may allow the drone to detect and avoid collisions. The binocular cameras may identify fine obstacles. The rear radar may measure distances up to 100 meters with an accuracy of 1 cm. The drone may utilize the binocular cameras, the front radar, and the LiDAR sensor cooperatively to detect and avoid obstacles.

An object of the invention is to provide a drone for applying agricultural chemicals.

Another object of the invention is to provide interchangeable tanks for carrying liquid agricultural chemical or solid agricultural chemicals.

A further object of the invention is to binocular cameras, front radar, rear radar, and a LiDAR sensor which work cooperatively to detect and avoid obstacles.

Yet another object of the invention is to provide interchangeable 30 Ah and 40 Ah waterproof batteries to power the drone.

These together with additional objects, features and advantages of the agricultural chemical application drone will be readily apparent to those of ordinary skill in the art upon reading the following detailed description of the presently preferred, but nonetheless illustrative, embodiments when taken in conjunction with the accompanying drawings.

In this respect, before explaining the current embodiments of the agricultural chemical application drone in detail, it is to be understood that the agricultural chemical application drone is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the agricultural chemical application drone.

It is therefore important that the claims be regarded as including such equivalent construction insofar as they do not depart from the spirit and scope of the agricultural chemical application drone. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
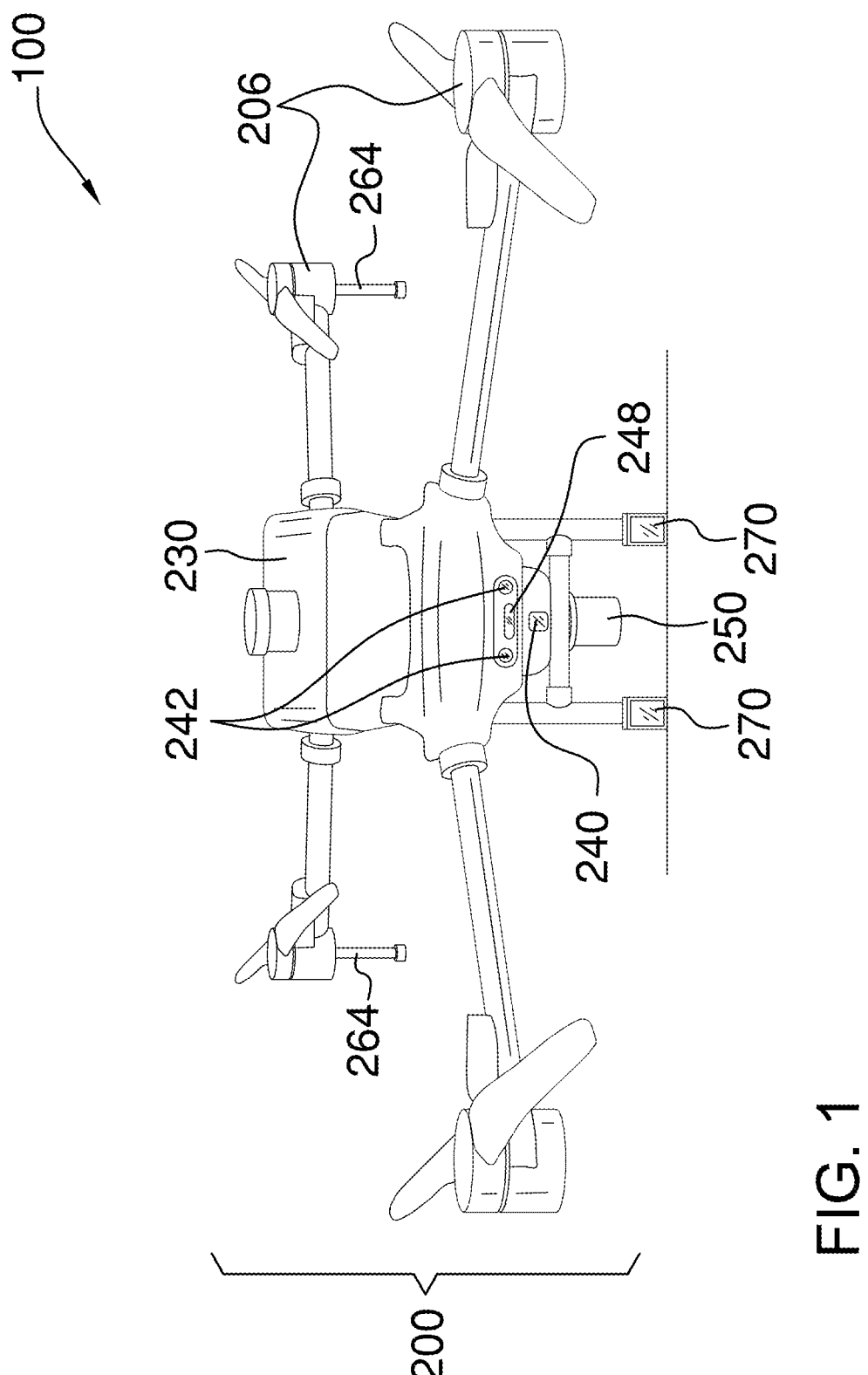
FIG. 1 is a front view of an embodiment of the disclosure.
Figure 2:
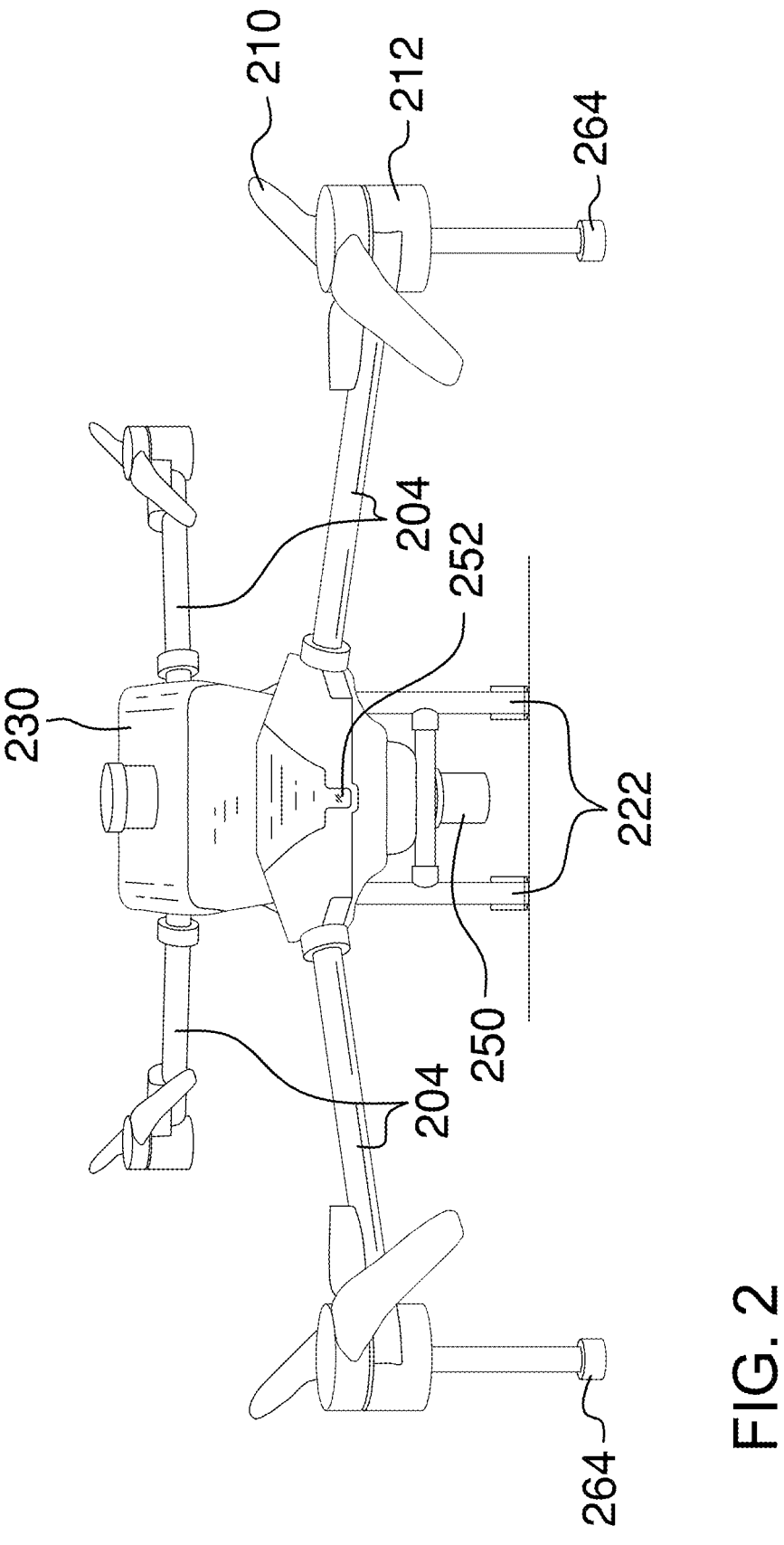
FIG. 2 is a rear view of an embodiment of the disclosure.
Figure 3:
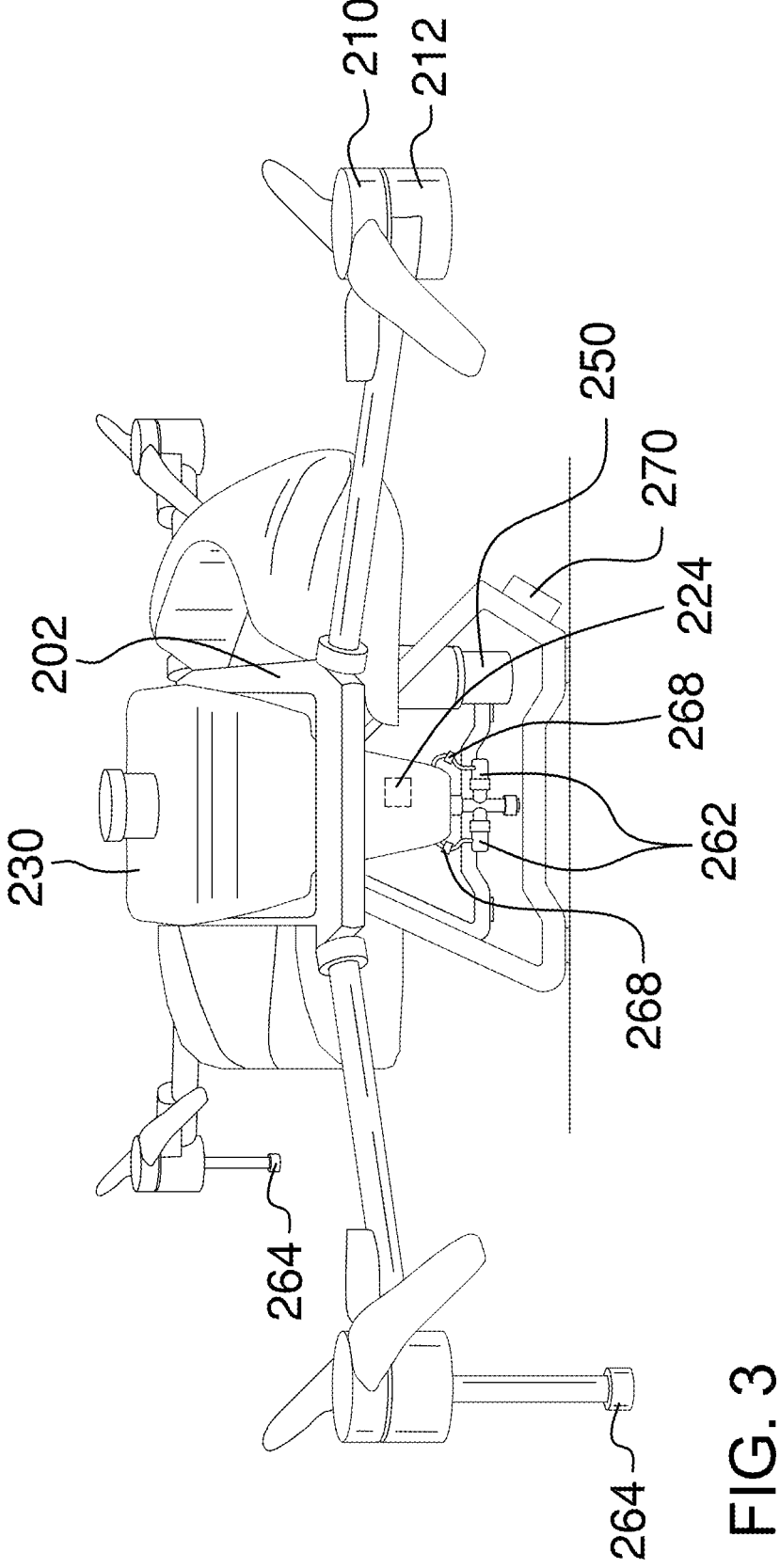
FIG. 3 is a side view of an embodiment of the disclosure.
Figure 4:
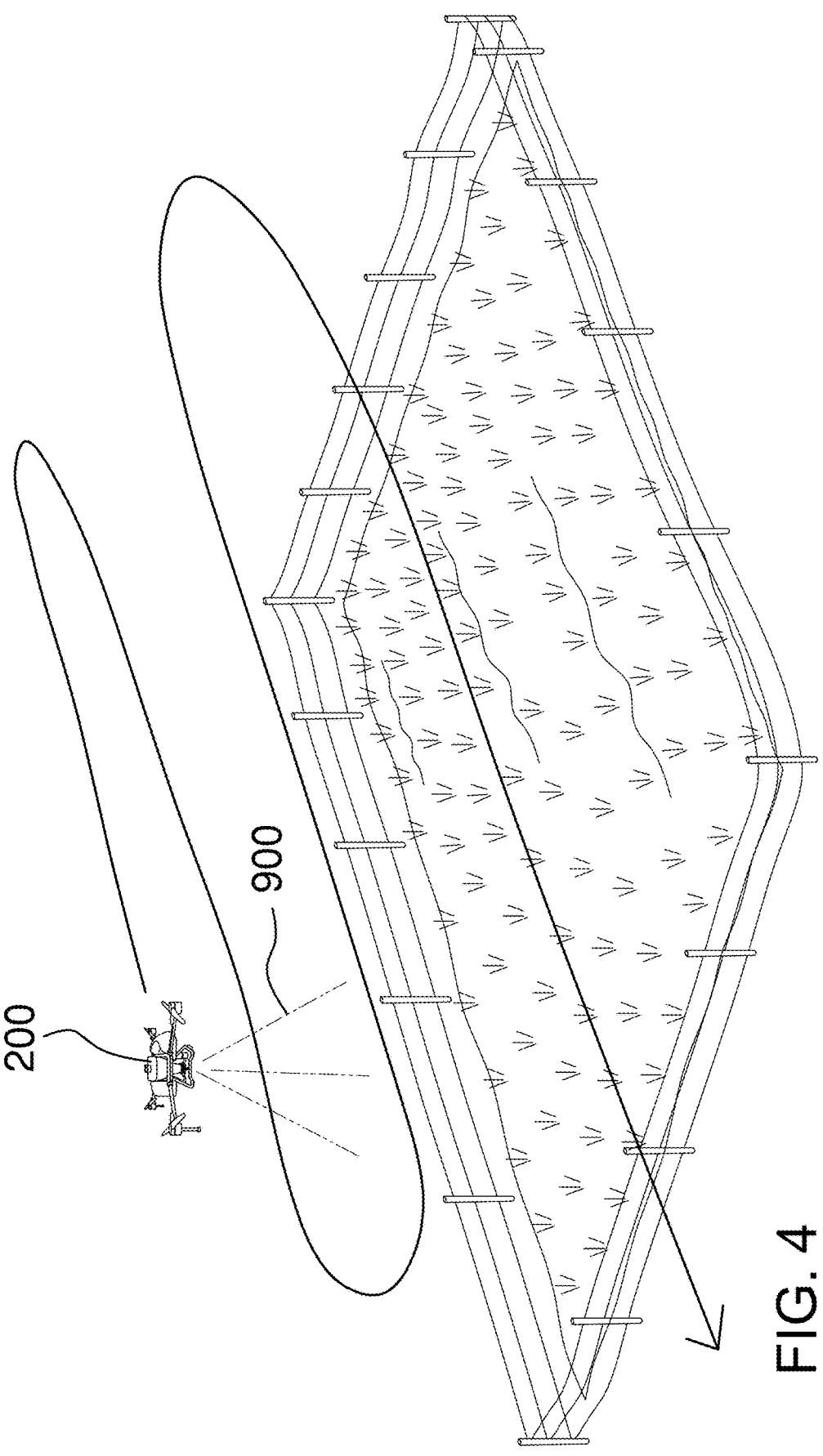
FIG. 4 is an in-use view of an embodiment of the disclosure.
Figure 5:
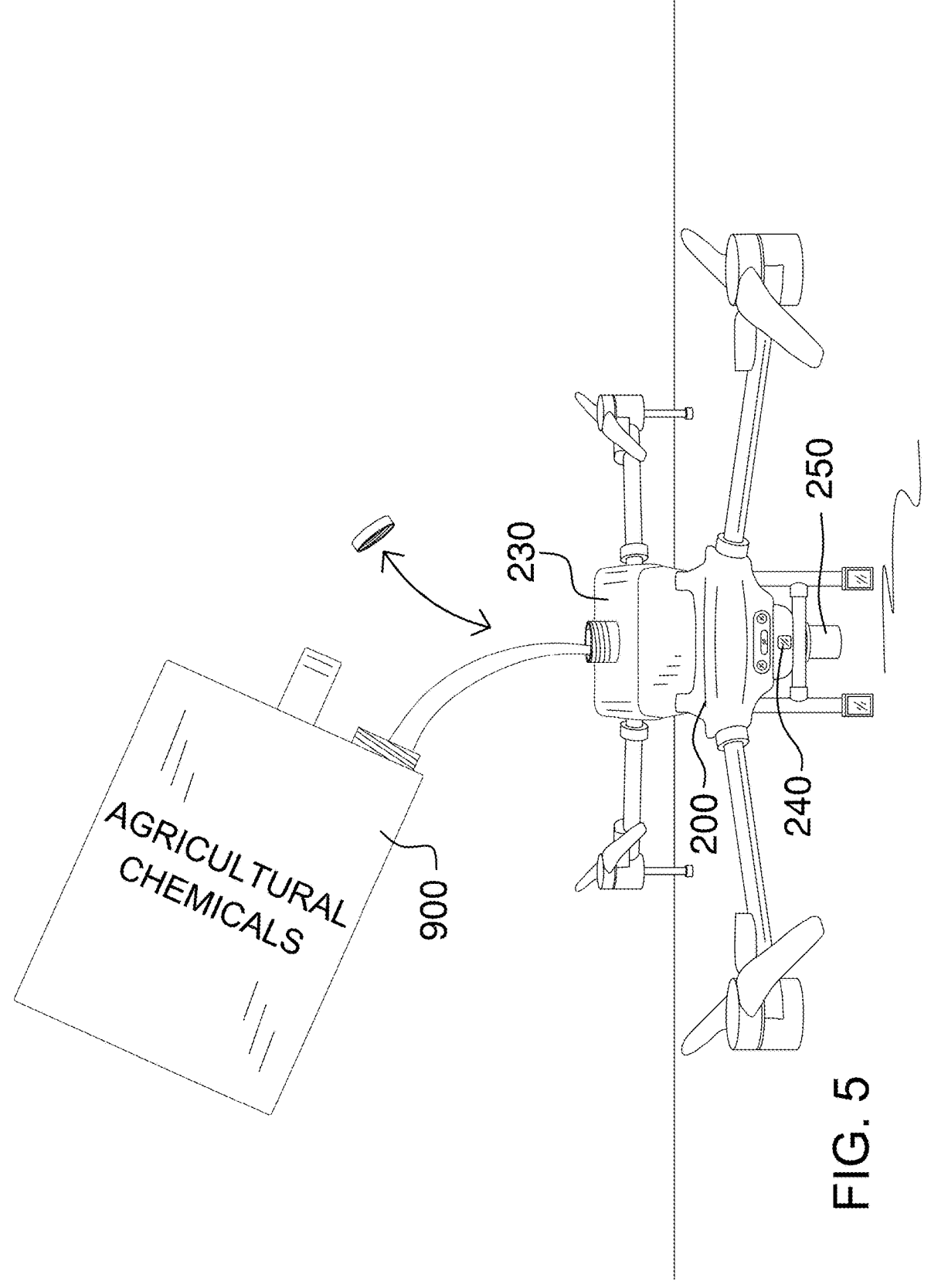
FIG. 5 is a detail view of an embodiment of the disclosure, illustrating the tank being refilled.

Detailed reference will now be made to a first potential embodiment of the disclosure, which is illustrated in FIGS. 1 through 5.

The agricultural chemical application drone 100 (hereinafter invention) comprises a drone 200, a computer processor 224, a tank 230, a monocular camera 240, binocular cameras 242, a LiDAR sensor 248, a front radar 250, a rear radar 252, a spraying system, and one or more flood lights 270. The drone 200 may be an unmanned aerial vehicle (UAV) optimized for agricultural applications. The drone 200 may be operable to carry a payload of 150 kg. The front radar 250 may allow the drone 200 to detect and avoid collisions. The binocular cameras 242 may identify fine obstacles. The rear radar 252 may measure distances up to 100 meters with an accuracy of 1 cm. The drone 200 may utilize the binocular cameras 242, the front radar 250, and the LiDAR sensor 248 cooperatively to detect and avoid obstacles.

As non-limiting examples, fine obstacles may comprise tree leaves, branches with a diameter of less than 5 cm, power wires, and other objects with an area of less than 3×3 cm.

The drone 200 may comprise a plurality of rotors 206, a motor speed controller, a motor control, a plurality of carbon fiber arms 204, one or more landing skids 222, and a chassis 202 made of aluminum. An individual rotor selected from the plurality of rotors 206 may comprise a motor 212 and a propeller 210 at the end of an individual carbon fiber arm. The chassis 202 may comprise a rectangular tubular mounting system and arms that can be folded to decrease the size of the drone 200. The rectangular tubular mounting system may offer greater strength for supporting heavy loads and operations in demanding weather conditions; improved locks for added security; from 4.2 m to 1.8 m with the arms folded, making the drone 200 more compact and easier to store and has improved flight safety.

In a preferred embodiment, the plurality of rotors 206 comprise four rotors.

In a preferred embodiment, the drone 200 may have four high-power motors of 10000 W peak and with IPX6 protection, having enameled wires that contain high temperature and water protection, waterproof connections to a battery, with great power redundancy, making the flight safer; high-power motor speed controller, able to withstand extremely high electrical currents; 62-inch propeller blades, with greater energy efficiency and greater durability; and maximum takeoff weight of 150 kg. The drone 200 may generate up to 232 kg of force with the 4 combined motors.

A battery selected from a 30 Ah battery and a 40 Ah battery, both waterproof, may be available to power the drone 200. With the 30 Ah battery, the flight time may be from 7 to 15 minutes, with a flow rate of 10 liters per hectare or more when applying liquid or solid products. The 30 Ah battery or the 40 Ah battery may be chosen at the time of purchase.

The computer processor 224 may perform all the necessary calculations, including the trajectory, real time kinematics (GPS/RTK), height determination, and other functions of the drone 200 during the application of crop protection products by the drone 200.

The drone 200 may comprise an image transmission module. The image transmission module may transmit images from the monocular camera 240 to a touchscreen remote control. In a preferred embodiment, the image transmission module may have long-distance Wi-Fi and 4G enhancement, with the following characteristics: compatibility with external image transmission enhancement module; long-distance Wi-Fi image transmission; 4G dependent on the signal of the local cellular operator; and automatic switching to 4G signal in case of weak signal.

The spraying system may comprise the tank 230 to hold an agricultural chemical 900. The tank 230 may be at least a 60-liter tank for a liquid chemical. The tank 230 may be at least a 100-liter tank for sowing a solid chemical. The 100-liter tank may have a maximum load capacity of 80 kg. The customer may choose between the two tanks, which can be swapped without the need for disassembly, just by connecting a communication and power cable.

The drone 200 may have a perception system equipped with the monocular camera 240. The monocular camera 240 may have a virtual gimbal with an adjustable angle. The monocular camera 240 may be front mounted on the drone

4

200. In a preferred embodiment, the monocular camera 240 may have a resolution of up to 1920×1080, with effective pixels increased from 2 megapixels to 4 megapixels, and may offer an 80 degree horizontal and 120 degree vertical field of view. In addition, the monocular camera 240 may include support for night vision, providing better performance in low-light conditions.

The perception system may be based upon binocular vision, consisting of an upgraded visual obstacle avoidance system, able to detect obstacles at a distance of 30 meters or more, with a maximum detection speed of 7 m/s. The binocular cameras 242 may include support for obstacle avoidance by merging image data with the front radar 250, further enhancing the system's performance. The binocular cameras 242 may also support obstacle avoidance using only vision, without the need for the front radar 250.

The perception system may comprise the LiDAR sensor 248 and the binocular cameras 242 located on the front of the drone 200. Once the drone 200 is up and running, the computer processor 224 may receive the data from the LiDAR sensor 248 and the images from the binocular cameras 242. The computer processor 224 may calculate distances from the LiDAR sensor 248 and may determine the distance of the items present in the binocular cameras 242 images through the process of stereo vision. With these two distance inputs, the computer processor 224 may perform obstacle detection with more detail and speed, allowing the drone 200 to swerve or avoid an accident.

The perception system may further comprise the front radar 250 thus providing a 360 degree view, with a detection range of 50 meters or more, as well as support for obstacle avoidance with binocular vision fusion.

The rear radar 252, implemented as a single chip, may enhance the obstacle avoidance capability at the rear, ensuring greater safety during operation.

For liquid application, the drone 200 may comprise a pair of primary spray nozzles 264 located beneath the rear rotors. The pair of primary spray nozzles 264 may be supplemented by a pair of secondary spray nozzles added beneath the front rotors. One or more pumps 262 may receive the liquid chemical from the 60-liter tank and pump the liquid chemical to the pair of primary spray nozzles 264 and/or the pair of secondary spray nozzles. The flow rate may be controlled by one or more flow sensors 268.

In a preferred embodiment, the pair of primary spray nozzles 264 (and/or <secnozzles> may have a flow rate of up to 16 liters, using two pumps of up to 8 liters working together. The drone 200 features highly reliable centrifugal spray nozzles with a proven service life of more than 300 hours, as well as robust and durable solenoid valves. The flow rate is 30 L/minute with the pair of primary spray nozzles 264, meeting the high demand for spraying vegetables and fruits, and can exceed 40 L/minute with the pair of primary spray nozzles 264 and the pair of secondary spray nozzles, being controlled by the one or more flow sensors 268.

For solid application, the drone 200 may be operable to apply granulates from an optional tank of up to 80 kg or 110 liters. In a preferred embodiment, the drone 200 may have a discharge speed of 300 kg/min, ideal for the rapid application of fertilizers over large areas. The feeding method may be done utilizing a screw conveyor, which reduces the error from 11% to less than 5%. The system may be compatible with small, medium and large screw conveyors, allowing the sowing of various types and sizes of materials.

The perception system may be equipped with the one or more flood lights 270 to improve the night vision capability in conjunction with the monocular camera 240 and to provide greater safety for night flights. In a preferred embodiment, the one or more flood lights 270 may be two 75 W floodlights.

The touchscreen remote control may be adapted for a user to operate such that the drone 200 may be commanded from a remote location. The touchscreen remote control may send commands to the drone 200 utilizing a wireless link such as Wi-Fi, LoRa, RTK, or any combination thereof. The drone 200 may have modes of operation that enable the drone 200 to be guided from the ground and semi-autonomous operation whereby the drone 200 follows a preprogrammed route.

In a preferred embodiment, the power system may be equipped with an intelligent blade-type battery, which supports passive heat dissipation by air conduction during flight.

The drone 200 may utilize heat dissipation by active air cooling with significantly improved efficiency, providing excellent temperature control and meeting the requirements of high-intensity work. In real-world tests, in an environment with a constant temperature of 60 degrees C., after several fast charge cycles, the maximum battery cell temperature reached 71 degrees C., stabilizing without further increase.

In a preferred embodiment, the charger's power system may have a rated output of 8500 W and a charging time of 25% to 95% estimated between 7 and 15 minutes of flight.

The power system may include an improved large-capacity fan, which completely eliminates the problem of high battery temperature during summer operations.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, 1G, 2G, 3G, 4G, and 5G may refer to generations of mobile phone communication standards. 1G may refer to the first-generation of analog cellular networks that were introduced during the 9180s. 2G may refer to the second-generation of digital cellular networks, also sometimes referred to as GSM. 3G may refer to the third-generation of wireless mobile telecommunications technology developed by 3GPP. 4G may refer to the fourth-generation of broadband cellular network technology also referred to as LTE. 5G may refer to the fifth-generation technology standard for broadband cellular networks, which cellular phone companies began deploying worldwide in 2019.

As used in this disclosure, "autonomous" may refer to a device that is capable of independent operation. By independent operation is meant that the primary function of the device is self-contained and does not require external control or guidance to perform the primary function. Within this disclosure, it is explicitly assumed that incidental control functions, such as initiating the operation of the primary function or maintenance functions, may reside outside of the device.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "camera" may be a sensor that converts light into electric signals that encode the spatial orientation of the captured light in a manner that reproduces the images seen by a human eye.

As used herein, the words "data" and "information" may be used interchangeably to refer to raw, unprocessed facts and to facts that have been processed, structured, organized, or presented in a context that makes the facts useful.

As used in this disclosure, a "field of view" may refer to one or more angles that delimit an area from which electromagnetic radiation will be sensed by a person or an image sensor.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "GPS" may refer to a device that uses signals received from a system of navigational satellites to determine the position of the device. GPS is an acronym for Global Positioning System.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "LiDAR" may refer to a method of determining the range to an object by bouncing light off of the object and measuring the time for the reflected light to return to the point of origination. LiDAR is an acronym for 'light detection and ranging'. A laser may commonly be used as the light source.

As used herein, "LoRa" may refer to a radio communication technique that utilizes spread spectrum modulation.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "propeller" may refer to a device comprising a rotating hub and radially-oriented blades. The blades may be set at a pitch such that rotation of the propeller exerts a force against a fluid such as air or water. In some embodiments, the pitch of the blades may be changed while the propeller is in use.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

As used herein, "RTK" may refer to Real Time Kinematics. A GPS receiver capable of RTK may take in the normal signals from the Global Navigation Satellite Systems along with a correction stream to achieve 1 cm positional accuracy.

As used in this disclosure, a "sensor" may be a device that quantitatively measures a physical stimulus.

As used in this disclosure, a "solenoid" may be a coil of electrical wire that generates a magnetic field and that can be used to mechanically move a shaft or armature.

As used herein, "such as" may introduce one or more non-limiting examples.

As used in this disclosure, a "touchscreen" may be an interface that allows a user to interface with a logical device by touching the image bearing surface of a display.

As used herein, "unmanned aerial vehicle" (UAV) or "drone" may refer to an aircraft without a human pilot aboard. UAVs may be remotely piloted and may comprise a certain degree of autonomy. Common uses for UAVs include, but are not limited to, surveillance, package delivery, and racing.

As used in this disclosure, "vertical" may refer to a direction that is parallel to the local force of gravity. Unless specifically noted in this disclosure, the vertical direction is always perpendicular to horizontal.

As used herein, the word "waterproof" may refer to an object that is not harmed when being exposed to water, including total submersion for a period of time. When used as a verb, "waterproof" may refer to taking steps to make an object waterproof. Non-limiting examples of such steps may include applying special coatings or using gaskets to seal seams and entry points of an enclosure.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An agricultural chemical application drone:

said drone further comprising a computer processor, a tank, a front radar, a rear radar, and a spraying system;

wherein the drone is an unmanned aerial vehicle optimized for agricultural applications;

wherein the drone is operable to carry a payload;

wherein the front radar allows the drone to detect and avoid collisions;

wherein the drone utilizes the front radar, and the LiDAR sensor cooperatively to detect and avoid obstacles;

wherein for liquid application, the drone comprises a pair of primary spray nozzles located beneath the rear rotors;

wherein the pair of primary spray nozzles is supplemented by a pair of secondary spray nozzles added beneath the front rotors.

2. The agricultural chemical application drone according to claim 1 wherein the drone comprises the plurality of rotors, a motor speed controller, a motor control, a plurality of carbon fiber arms, one or more landing skids, and a chassis made of aluminum;

wherein an individual rotor selected from the plurality of rotors comprises a motor and a propeller at the end of an individual carbon fiber arm;

wherein the chassis comprises a rectangular tubular mounting system and arms that can be folded to decrease the size of the drone.

3. The agricultural chemical application drone according to claim 2 wherein the plurality of rotors comprise four rotors;

wherein the payload is 150 kg.

4. The agricultural chemical application drone according to claim 2 wherein a battery selected from a 30 Ah battery and a 40 Ah battery, both waterproof, powers the drone.

5. The agricultural chemical application drone according to claim 4 wherein the computer processor performs all calculations, including the trajectory, real time kinematics, height determination, and other functions of the drone.

6. The agricultural chemical application drone according to claim 5 wherein the spraying system comprises the tank to hold an agricultural chemical;

wherein the tank is at least a 60-liter tank for a liquid chemical.

7. The agricultural chemical application drone according to claim 6 wherein the tank is at least a 100-liter tank for sowing a solid chemical;

wherein the 100-liter tank has a maximum load capacity of 80 kg.

8. The agricultural chemical application drone according to claim 7 wherein the perception system comprises a LiDAR sensor located on the front of the drone;

wherein the computer processor receives the data from the LiDAR sensor;

wherein the computer processor calculates distances from the LiDAR sensor and determines the distance of the items present through the process of stereo vision;

wherein with these two distance inputs, the computer processor performs obstacle detection, allowing the drone to swerve or avoid an accident.

9. The agricultural chemical application drone according to claim 8 wherein the perception system further comprises the front radar thus providing a 360-degree view, with a detection range of 50 meters or more;

wherein the rear radar measures distances up to 100 meters with an accuracy of 1 cm.

10. The agricultural chemical application drone according to claim 9 wherein the rear radar enhances the obstacle avoidance capability at the rear, ensuring greater safety during operation.

11. The agricultural chemical application drone according to claim 10 wherein one or more pumps receive the liquid chemical from the 60-liter tank and pump the liquid chemical to the pair of primary spray nozzles and/or the pair of secondary spray nozzles;

wherein the flow rate is controlled by one or more flow sensors.

12. The agricultural chemical application drone according to claim 10 wherein for solid application, the drone is operable to apply granulates from an optional tank of up to 80 kg or 110 liters.

13. The agricultural chemical application drone according to claim 10 wherein the perception system is further equipped with one or more flood lights to provide greater safety for night flights.

14. The agricultural chemical application drone according to claim 13 wherein the touchscreen remote control is adapted for a user to operate such that the drone is commanded from a remote location;

wherein the touchscreen remote control sends commands to the drone utilizing a wireless link.

15. The agricultural chemical application drone according to claim 14 wherein the drone has modes of operation that enable the drone to be guided from the ground and semi-autonomous operation whereby the drone follows a preprogrammed route.

* * * * *